Jan. 12, 1932.   E. G. HANKS   1,840,507
EDUCATIONAL DEVICE
Filed June 30, 1926   2 Sheets-Sheet 1

Inventor
EMILY G. HANKS
By her Attorneys
Bohleber & Ledbetter

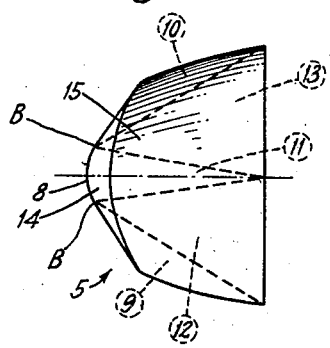
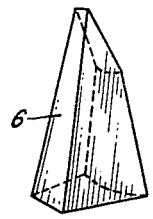
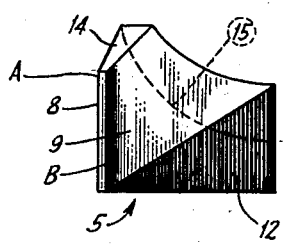
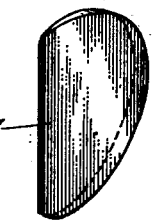
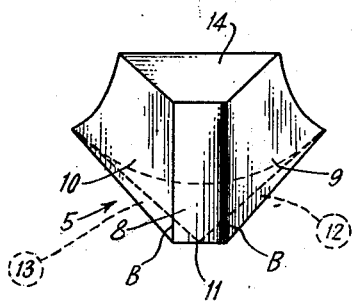
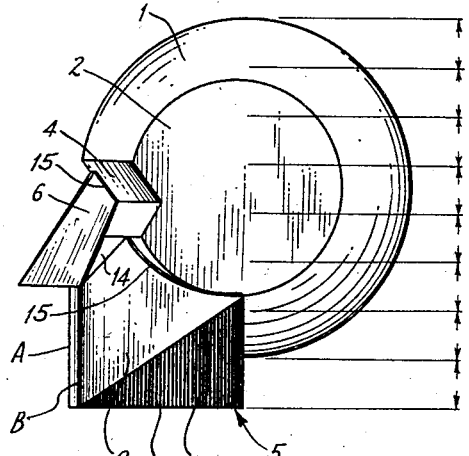

Patented Jan. 12, 1932

1,840,507

UNITED STATES PATENT OFFICE

EMILY G. HANKS, OF BROOKLYN, NEW YORK

EDUCATIONAL DEVICE

Application filed June 30, 1926. Serial No. 119,549.

This invention relates to apparatus and a method for instructing and assisting art students and others interested in sketching, drawing or modeling objects and more particularly anatomical forms such for example as the human head.

It is an object of this invention to provide apparatus and a method for demonstrating and emphasizing the derivation of objects having individual distinguishing featural characteristics from fundamental and common geometrical shapes lacking such characteristics.

More especially, it is an object of this invention to provide an apparatus which will facilitate and accentuate for the student the mental concept of an object to be formed, sketched, drawn, or copied as a fundamental and common geometrical shape, solid, or mass, modified as required, whereby the artistic sense and ability of the individual to sketch, draw, form or model an object is developed, stimulated and trained along proper lines and in accordance with correct principles.

The features of novelty which I believe to be characteristic of my invention are pointed out with particularity in the appended claims. My invention itself, however, both as to its fundamental principles and as to its practical embodiments, will best be understood by reference to the specification and accompanying drawings in which:

Figure 6 is a top plan view of a detachable mouth and chin member.

Figure 7 is a side elevation of the same.

Figure 8 is a front view thereof.

Figure 9 is a perspective view of the nose member.

Figure 10 is a perspective view of the ear member, and

Figure 11 is a profile view of the complete head drawn to scale showing the relative dimensions of the various parts.

Figure 1:
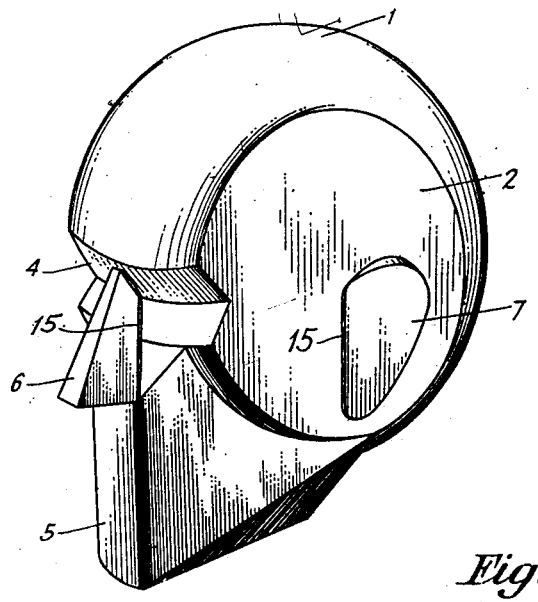
Figure 1 is a perspective view of a head made up in accordance with my invention.

Heretofore drawing and modeling anatomical forms and more particularly the construction of the human head has been presented as a study of one solid of various surface forms. For instance, features have been sketched upon an egg. This egg with the features sketched upon it might be turned and placed in any desired position and angle while the student studied the effects of foreshortening and perspective. Also various simplified types of heads have been used in art schools to teach proportion, foreshortening and perspective to beginners.

It has also been suggested that the head may be conceived as an assembly of several block forms, such as cubes and cylinders. With the exception of the egg method which can only be used as an initial step in study because of its obvious limitations, all of the forms referred to are difficult for the student to grasp or conceive mentally as a unit or entity because of their complexity. The beginner's attention is invariably distracted from the foundational shape and proportions and focuses itself upon the individual details such as eyes, nose, lips and the like or on individual blocks with the result that the foundational or fundamental and characteristic shape and proportion of the head is missed, as a result of which the beginner's drawings or models show an exaggeration of detail and an incorrect proportion of the entity.

In accordance with my invention, I provide an apparatus and method which shows the development of anatomical forms from a common and well known geometrical shape or plurality of shapes or masses. For example, in the study of the head there is provided first a sphere, having symmetrical or similar sections cut off from opposite sides at a slight angle to each other and slightly nearer to one side of the sphere than to the other. The narrow side remaining after the sections are removed corresponds in the finished head to the front and the wide side to the back of the head. Across the front at approximately the point of minimum distance between the sections there is provided a substantially V-shaped groove. There is also provided a solid somewhat roughly corresponding to a truncated cone or pyramid.

In order to show the derivation of the shape of the head from the sphere and cone the removable sections are preferably formed in such a way that they may be readily placed in their proper position or removed therefrom. In demonstrating the derivation of the head the sections will be placed in position so that there is formed a complete sphere which may be rolled about on a flat surface to show that it is a perfect sphere. The side sections may then be removed, the groove member also removed and the truncated cone or pyramid placed upon this sphere below the groove at which time it will be seen that the mutilated sphere forms a likeness of the fundamental shape and proportions of the head including the brain-case, eye sockets, cheek bones, and the upper part of the jaw ramus, while the cone or pyramid includes the lower or front part of the upper jawbone, all the teeth, and the lower jawbone to as far back as the angle of jaw and the lower part of the ramus. In short, the sphere represents the brain-case and the cone, the muzzle. After a pyramid is added to represent the nose the outline of the head will be very striking. At the same time there are no details present to distract the attention of the student from the fundamental shape and proportion and he may then study this shape and proportion, and the effect of foreshortening and perspective at various angles and distances by sketching, drawing, modeling or the like.

Figure 2:
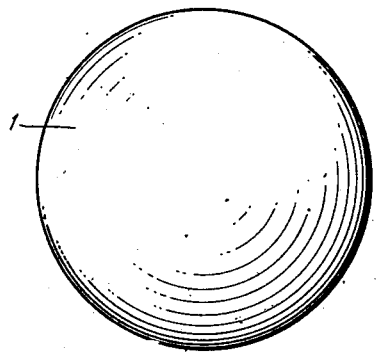
Figure 2 shows the sphere which is the starting point of the head.
Figure 3:
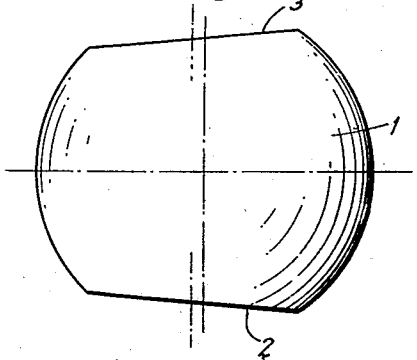
Figure 3 shows the sphere with two sections removed forming the second step.

Referring now more particularly to Figure 1, 1 designates the mutilated sphere having a flat section 2 formed on one side thereof, a similar flat section 3 formed on the other side, a substantially V-shaped groove 4 extending across the front, a conical or pyramidal chin or muzzle, a pyramidal nose 6 and a pair of ears 7. In the illustrated embodiment a generally pyramidal featural member or chin 5 is shown. In forming the head there is preferably first provided a sphere 1 as shown in Figure 2. This sphere is cut as shown in Figure 3 to provide similar flat sections 2 and 3 on opposite sides of the sphere inclined at a slight angle to each other and set with their centers slightly forward from the center of the sphere. It will be understood that the exact dimensions and proportions of the side sections will vary with the racial characteristics of the head to be studied.

Figure 4:
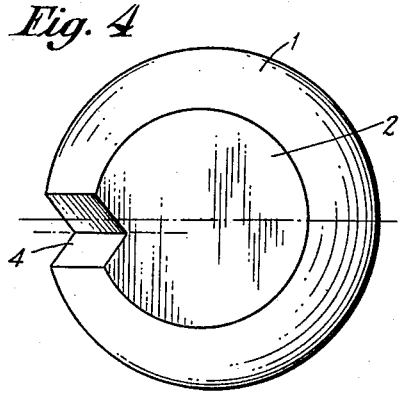
Figures 4 and 5 show the same with a groove cut therein, the figures being taken at right angles to each other.
Figure 5:
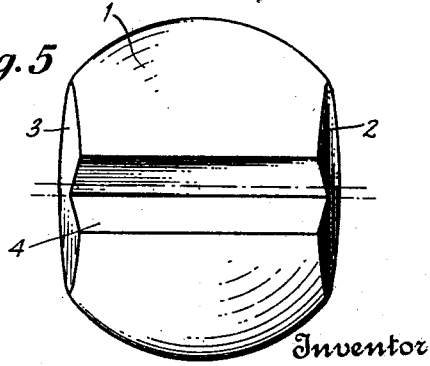

After the side sections have been removed the V-shaped or substantially V-shaped groove is cut across the front or narrow side of the mutilated sphere and slightly below the center thereof as shown by Figures 4 and 5. There will then be provided an irregular shaped pyramid or truncated cone 5 as shown in Figures 6, 7 and 8 and also in Figure 1 which may be placed upon the mutilated sphere in the position as shown by Figures 1 and 11. This pyramid may comprise a curved front face 8, side faces 9 and 10, a triangular bottom face 11, inclined faces 12 and 13, top face 14 and inner spherical face 15.

The line that forms the base line of the cone or muzzle when the cone is attached to the sphere and the head placed upright is one unit of measurement below the lowest point of the sphere, which is seven units in diameter.

The front edge A of the cone is perpendicular to the base plane of the cone, as will be seen from Figure 11, and if projected upward to the horizontal diametrical plane of the sphere, it is one quarter of a unit radially outside the true sphere.

If another pair of lines B be drawn parallel to this line and one quarter unit nearer the sphere and tangent thereto, these lines mark the division line of the front and cheek planes. The cone solid follows these lines from the chin only to the height of the nostrils, where the cone slopes back to meet the sphere at the lower edge of the groove which forms the eye sockets.

As will be seen from Figure 6, the center line of the face is seen to be placed in the center of a curving surface which arches uniformly from the line B on one side to line B on the other. The height of this arch is one quarter unit, as will be seen from Figure 11.

The nose member 6 is a simple form of irregular pyramid as will be seen from Figure 9 and the ear a relatively thin member of proper shape as will be seen, from Figures 1 and 10.

The sphere and the parts removable therefrom may be made from any suitable material such as wood or may be cast or molded of suitable material for example bakelite. The chin and nose members may also be of the same material and may be provided with means for retaining them in position upon the sphere such as a layer of adhesive 17, such as modelling clay, on the inner side, or projections may be provided on the rear surface and sockets for these projects on the sphere. However, for some purposes, I find it preferable to form the chin, nose and ear members of plastic material such as non-hardening modeling clay, which may be placed upon the sphere and which will stick thereon until removed. The particular advantage of this form of construction is that the elementary forms may first be made until the correct proportion has been obtained, after which the student may proceed to form the details such as the eyes, mouth, etc., or if desired, the plastic material may be added and shaped as desired to round off all sharp edges and corners or in fact to entirely conceal the foundational mutilated sphere, thereby producing a modelled or shaped head having a complete surface of plastic material.

The use of plastic material for forming the features is of particular advantage in that it affords a very practical working demonstration of the widely different types of heads which may be produced all upon the same foundational or fundamental shape, merely by varying the individual distinguishing features. For instance, a slight alteration in the shape of the nose or mouth only, without any change whatsoever in the underlying proportions will produce heads of widely different appearance.

While I have shown and described my invention as applied to anatomical forms, and more particularly to the human head, it is clear that my invention is not limited thereto but that the principles embodied and applied therein are capable of universal application as will be apparent to those skilled in the art. I therefore wish it understood that modifications and changes may be made as will be apparent to those skilled in the art without departing from the spirit and scope of my invention.

What I claim is:

1. An educational device for instructing as to the true proportions and relative positions of the features of the human head comprising a sphere having sections removed from opposite sides along planes which intersect outside of the sphere and a groove in the sphere between the planes of the removed sections and approximate the point of minimum separation of the planes.

2. An educational device for instructing as to the true proportions and relative positions of the features of the human head comprising a sphere having sections removed from opposite sides along planes which intersect outside of the sphere, a groove in the sphere between the planes of the removed sections and approximate the point of minimum separation of the planes, and a pyramidal member spaced midway between the planes and partially inserted into and bisecting the groove.

3. An educational device for instructing as to the true proportions and relative positions of the features of the human head comprising a sphere having sections removed from opposite sides along planes which intersect outside of the sphere, a groove in the sphere between the planes of the removed sections and approximate the point of minimum separation of the planes, a pyramidal member spaced midway between the planes and partially inserted into and bisecting the groove, and a second pyramidal member disposed midway between the planes and below and in contact with the first pyramidal member.

4. An educational device for instructing as to the true proportions and relative positions of the features of the human head comprising a sphere having sections removed from opposite sides along planes which intersect outside of the sphere, a groove in the sphere between the planes of the removed sections and approximate the point of minimum separation of the planes, a pyramidal member spaced midway between the planes and partially inserted into and bisecting the groove, a second pyramidal member disposed midway between the planes and below and in contact with the first pyramidal member, and a pair of ears, one for each section, the upper edge of each ear being substantially in line with the groove.

5. An educational device for instructing as to the true proportions and relative positions of the features of the human head comprising a rounded solid body having sections removed from opposite sides along planes which intersect outside of the rounded solid body, and a groove in the rounded body between the planes of the removed sections and approximate the point of minimum separation of the planes.

6. An educational device for instructing as to the true proportions and relative positions of the features of the human head comprising a rounded solid body having sections removed from opposite sides along planes which intersect outside of the rounded solid body, a groove in the rounded solid body between the planes of the removed sections and approximate the point of minimum separation of the planes, and a pyramidal member spaced midway between the planes and partially inserted into and bisecting the groove.

7. An educational device for instructing as to the true proportions and relative positions of the features of the human head comprising a rounded solid body having sections removed from opposite sides along planes which intersect outside of the rounded solid body, a groove in the rounded solid body between the planes of the removed sections and approximate the point of minimum separation of the planes, a pyramidal member spaced midway between the planes and partially inserted into and disecting the groove, and a second pyramidal member disposed midway between the planes and below and in contact with the first pyradimal member.

8. An educational device for instructing as to the true proportions and relative positions of the features of the human head comprising a rounded solid body having sections removed from opposite sides along planes which intersect outside of the rounded solid body, a groove in the rounded solid body between the planes of the removed sections and approximate the point of minimum separation of the planes, a pyramidal member spaced midway between the planes and partially inserted into and bisecting the groove, a second pyramidal member disposed midway between the planes and below and in contact with the first pyramidal member, and a pair of members approximating the form of ears, one for each section, the upper edge of each ear being substantially in line with the groove.

9. An educational device for instructing in the study of art as to the true proportions and relative positions of the features of members of the animal kingdom to be depicted comprising a foundational solid formed of a modified geometric form approximating the relative size, shape and proportions of the features of the subject to be depicted, and featural means approximating the relative size, shape and proportions of the features of the said subject, said featural means being carried by the foundational solid in their true relative position.

10. An educational device for instructing as to the true proportions and relative positions of the features of the human head comprising a rounded solid body, and sections removed from opposite sides along planes which intersect outside of the rounded solid body.

11. An educational device for instructing as to the true proportions and relative positions of the features of the human head comprising a rounded solid body, and a circumferential groove simulating the eye groove, the groove having intersecting sides and extending partly around the solid body in a plane passing substantially through the center thereof.

In testimony whereof I affix my signature.

EMILY G. HANKS.